United States Patent
Menache

[11] Patent Number: 5,901,662
[45] Date of Patent: May 11, 1999

[54] TRANSPONDER HOLDING CASE AS IMPLANT IN ANIMAL BREEDING AND KEEPING

[75] Inventor: Georg Menache, München, Germany

[73] Assignee: GSF-Forschungszentrum fur Umwelt und Gesundheit GmbH, Oberschleissheim, Germany

[21] Appl. No.: 08/896,831

[22] Filed: Jul. 18, 1997

[30] Foreign Application Priority Data

Jul. 18, 1996 [DE] Germany ............... 296 12 496 U

[51] Int. Cl.⁶ .................................................. A01K 29/00
[52] U.S. Cl. ............................................ 119/174; 128/899
[58] Field of Search .................... 119/174, 215; 128/899

[56] References Cited

U.S. PATENT DOCUMENTS 5,211,129  5/1993  Taylor et al. ..................... 128/899 X
5,482,008  1/1996  Stafford et al. ....................... 119/174

FOREIGN PATENT DOCUMENTS 649212  5/1994  Australia ................ 119/174

Primary Examiner—Robert P. Swiatek
Attorney, Agent, or Firm—McDermott, Will & Emery

[57] ABSTRACT

In order to fulfill the requirements in terms of biological compatibility and mechanical stability, a transponder-holding case is provided as implant in animal breeding and keeping, which case consists of a first case section and a second case section made of a biologically compatible synthetic material, with the two case sections being designed for being detachably fastened at one another, preferably through a self-sealing and self-locking threaded joint, so as to form a hermetically sealed holding space for a transponder to be received therein. For an improvement of the position-retaining function in the animal body at least one of the case sections presents at least one formed-in portion on ist outside, and at least on the outside of one case section a receiving area is provided for a preferably laser-engraved identifier mark.

9 Claims, 1 Drawing Sheet

TRANSPONDER HOLDING CASE AS IMPLANT IN ANIMAL BREEDING AND KEEPING

BACKGROUND OF THE INVENTION

The invention relates to a transponder-holding case as implant in animal breeding and keeping.

The application of transponder technology in breeding and keeping herds and flocks of animals for the food chain as a forgery-proof and lasting instrument of identification and verification is still in the pilot application phase. The topical problems of bovine spongiforme encephalopathy (BSE) and hormone administration, as well as the resulting controlling legislation are, however, going to ensure a world-wide application of this technique before long.

In correspondence with the transponder technology transponders are implanted in a part of the body of the animals where they cannot provoke any impairment of the well-being, the movements or the growth and where additionally the reading by means of a transponder-reading device is possible in a functionally reliable manner. Control via transponders offers a solution for herd and flock management, the observation and pursuit of owners, the case history and origin, with this technology replacing earmarks, tattoos and brand marks.

So far passive transponders have become known which are not equipped with an energy source of their own. The passive transponders are energized via a magnetic low-frequency field of a hand-held reading device, with the disadvantage that activation is possible only within a small range.

Meanwhile active transponders have been developed, too, which consist of a round ferrite core, 5 to 20 mm long, with a copper wire coil wound thereon and a board with an edge length of roughly 5 mm for mounting the transponder chip, as well as of a lithium power pack. Such active transponders permit the identification over distances longer than the range of passive transponders but they require a holding case, both for ensuring a perfect function and as a result of the materials involved, which case keeps any mechanical loads in the animal body away from the transponder, is easy to retrieve inside the animal body, and does not lead to inflammations of the surrounding tissue.

In initial field trials glass cases have been applied already which did not furnish satisfactory results, however, because they involve a high risk of glass break, of migrations inside the animal body, and of inflammatory processes in the surrounding tissue.

OBJECTS AND SUMMARY OF THE INVENTION

The present invention now aims at providing a transponder-holding case as implant in animal breeding and keeping, which takes mainly the requirements in terms of tissue tolerance and mechanical stability into account.

In accordance with the invention this aim is reached by a transponder-holding case presenting the features defined in claim 1.

Preferred further embodiments of the holding case are covered by the dependent claims.

In accordance with the invention hence a two-part case is provided which is made of a biologically compatible synthetic material and hence prevents inflammation of the surrounding tissue or encapsulation with the connective tissue. The inventive case expediently resists any loads occurring in the envisaged applications, and the configuration of the case prevents expediently any "migration" in the body of the animal.

The preferably provided detachable fastening of the case parts by means of a threaded joint allows for a dust-proof and fluid-proof screw connection which permits also a use of the case in other applications, e.g. applications exposed to environmental nuisance.

Once the case has been implanted in an animal body both the case size and the shape of the size expediently ensure that there is no "migration" of the case in the animal body. To this end the case is provided with notches or recesses, respectively, on its outside and has an axially symmetrical, preferably cylindrical, configuration so that it is also extremely simple to produce as turned part. Moreover it is also possible to design a sufficiently voluminous holding space for accommodation of fairly complex electronic systems, too.

A special polytetrafluoroethylene (PTFE) substance is preferably used as biologically compatible raw material. However, other biologically compatible synthetic materials may be employed, too, which fulfill the requirements in terms of a sufficient mechanical stability and a hermetic sealability of two case sections.

The envisaged threaded joint is preferably designed to be self-sealing and self-locking and can be unscrewed for detaching the case sections from one another only forcefully.

Another expedient provision is the formation of a holding surface for a preferably laser-engraved identifier mark on the outside of the case so as to render the case identifiable.

In accordance with a preferred embodiment the case has a cylindrical shape and a length of roughly 40 mm, with an outside diameter of some 16 mm, with the transponder-holding space being roughly 30 mm long and having a diameter of 8 mm, approximately.

BRIEF DESCRIPTION OF THE DRAWINGS

In the following, an embodiment of the invention will be described in more details with reference to the drawing. In the drawing.

DETAILED DESCRIPTION OF THE PREFERRED EMBODIMENT

Figure 1:
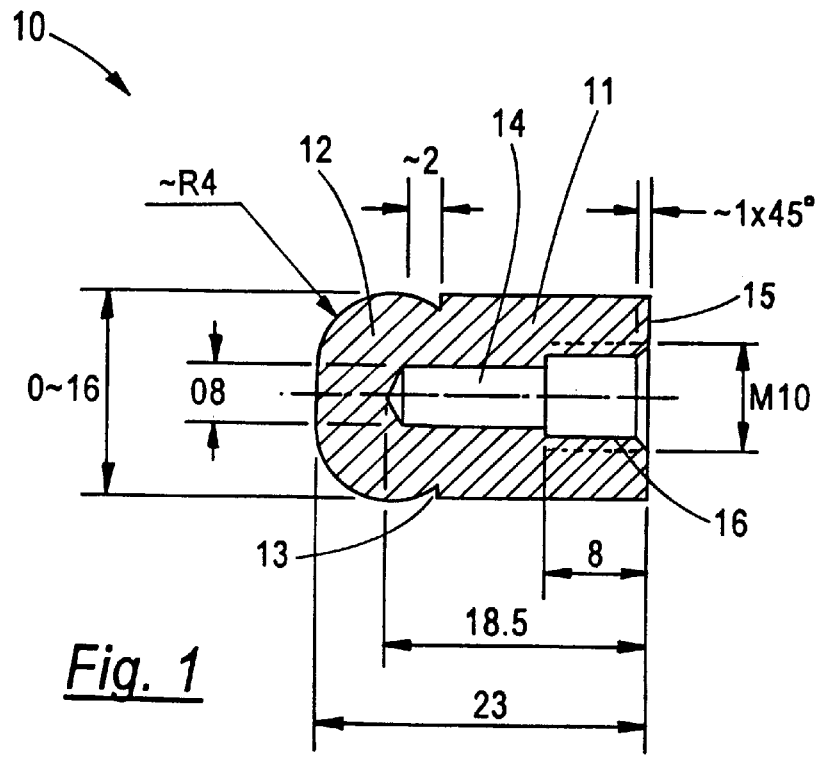
FIG. 1 is a longitudinal section taken through a first case section of an embodiment of an inventive transponder-holding case, with indication of the dimensions.
Figure 2:
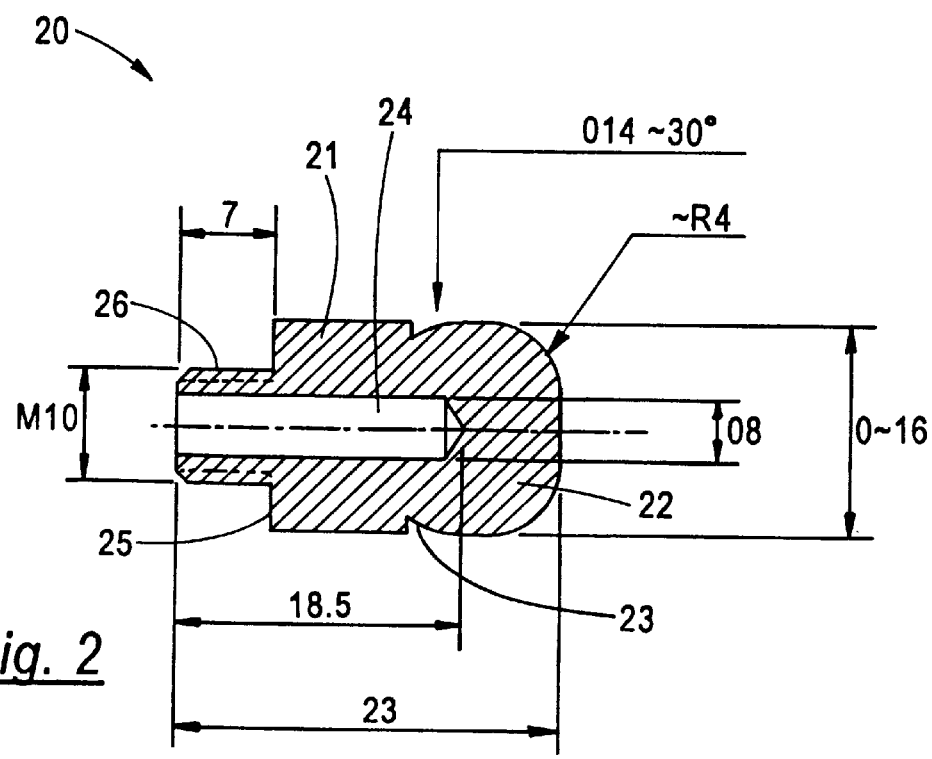
FIG. 2 is a longitudinal section taken through a second case section of an embodiment of the inventive transponder-holding case, which is adapted for airtight screwing to the first case section according to FIG. 1.

FIG. 1 shows a longitudinal section through a first case section 10 which is adapted for being detachably screwed to a second case section which is illustrated in FIG. 2. The case sections 10 and 20 are made of a biologically compatible synthetic material, e.g. a special PTFE material. They have an axially symmetrical shape and are easy to manufacture as turned part.

The first case section 10 is provided with a cylindrical section 11 and a rounded closed end 12 which is joined through a notch 13 opposite to the cylindrical section 11. The notch 13 may also be designed as rectangular recess instead of the sawtooth step as shown in FIG. 1. An axially symmetrical cylindrical holding space 14 is formed inside the first case section 10, which extends from the region of a connecting surface 15, which is provided for joining the first case section 10 to the second case section 20, up to the terminal section 12 in the manner of a blind bore. The cylindrical section 11 moreover includes an internal thread 16 in the region of the connecting surface 15, which has a wider diameter, as compared against the diameter of the holding space 14, and is chamfered relative to the connecting surface.

The dimensions of a preferred embodiment of the first case section 10 are indicated in FIG. 1. What is clearly visible is the fact that the thickness of the wall surrounding the holding space 14, and equally the wall thickness of the case section 20, is at least equal to the outside diameter of the holding space 14.

The design of the second case section 20 according to FIG. 2 corresponds to the design of the first case section 10, with the exception of an externally threaded connecting piece 26, which projects beyond a connecting surface 25, instead of the internal thread 16. The second case section 20 is hence also provided with a cylindrical section 21, a terminal section 22, a recess or a notch 23, respectively, as well as with a holding space 24.

For application of the transponder-holding case the transponder as such is initially placed into the holding space 14 or 24, respectively, whereupon the two case sections 10 and 20 are screwed together until the connecting surface 15 is placed near or on the connecting surface 25 of the second case section. The particular design of the thread with flanks changing in the screwing direction ensures that the screw joint is hermetically sealed by self-sealing action and that the threaded joint is self-locking at the same time.

What is claimed is:

1. Transponder-holding case as implant in animal breeding and comprising:

a first case section and a second case section made of a biologically compatible synthetic material, with the two case sections being designed for being detachably fastened at one another so as to form a hermetically sealed holding space for a transponder to he received therein, wherein said case sections are adapted to be fastened to each other through a self-sealing and self-locking threaded joint, and wherein at least one of said case sections presents at least one recessed portion on its outside for improved retaining of said holding case at a position within an animal body.

2. Holding case according to claim 1, characterized in that at least one of said case sections presents at least one recessed portion on its outside for improved retaining of said holding case at a position within the animal body, which recessed portion is realized as notch or groove, respectively.

3. Holding case according to claim 1, characterized in that each case section presents a rounded closed end.

4. Holding case according to claim 1, characterized by an axially symmetrical configuration of said case sections and of the holding space.

5. Holding case according to claim 1, characterized by a cylindrical configuration of said case sections and of the holding space.

6. Holding case according to claim 1, characterized in that the thickness of the walls of said case section which surround said holding space radially, is equal to or larger than the diameter of the holding space.

7. Holding case according to claim 1, characterized in that a special polytetrafluoroethylene material is provided as biologically compatible synthetic resin.

8. Holding case according to claim 1, characterized in that a receiving area is provided at least on the outside of a case section for a preferably laser-engraved identifier mark.

9. A transponder-holding case according to claim 1, wherein said at least one recessed portion is positioned about an outer circumferential surface of said at least one of said case sections and extends in a direction perpendicular to a longitudinal axis of said holding case.

* * * * *